(12) United States Patent
Kim et al.

(10) Patent No.: US 8,050,358 B2
(45) Date of Patent: Nov. 1, 2011

(54) BASE STATION TRANSMITTER FOR MOBILE TELECOMMUNICATION SYSTEM, METHOD FOR THAT SYSTEM

(75) Inventors: Il-Gyu Kim, Seoul (KR); Hyeong-Geun Park, Daejeon (KR); Young-Hoon Kim, Daejeon (KR); Seung-Chan Bang, Daejeon (KR)

(73) Assignees: Electronics and Telecommunications Research Institute, Daejeon (KR); SK Telecom., Co., Ltd., Seoul (KR); KT Corporation, Seongnam (KR)

( * ) Notice: Subject to any disclaimer, the term of this patent is extended or adjusted under 35 U.S.C. 154(b) by 849 days.

(21) Appl. No.: 12/064,767

(22) PCT Filed: Aug. 24, 2006

(86) PCT No.: PCT/KR2006/003333
§ 371 (c)(1),
(2), (4) Date: Feb. 25, 2008

(87) PCT Pub. No.: WO2007/024109
PCT Pub. Date: Mar. 1, 2007

(65) Prior Publication Data
US 2008/0232437 A1   Sep. 25, 2008

(30) Foreign Application Priority Data

Aug. 24, 2005   (KR) .................. 10-2005-0077798
Sep. 29, 2005   (KR) .................. 10-2005-0091081
Aug. 23, 2006   (KR) .................. 10-2006-0079678

(51) Int. Cl.
*H04L 27/00*   (2006.01)

(52) U.S. Cl. ........ 375/299; 375/130; 375/267; 455/101; 455/132

(58) Field of Classification Search .................. 375/299, 375/130, 267; 455/132, 101
See application file for complete search history.

(56) References Cited

U.S. PATENT DOCUMENTS 5,623,485 A * 4/1997 Bi .................................. 370/209
(Continued)

FOREIGN PATENT DOCUMENTS
KR   10-2005-0120244   12/2005

OTHER PUBLICATIONS

Alamouti, "A simple transmit diversity technique fro wireless communications" IEEE journal on Selected Areas of Communications, vol. 16 pp. 1451-1458, Oct. 1998.*

(Continued)

*Primary Examiner* — Juan A Torres
(74) *Attorney, Agent, or Firm* — Kile Park Goekjian Reed & McManus PLLC

(57) ABSTRACT

The present invention relates to a transmit diversity method of a mobile communication system and a base station transmitting apparatus using the same. A first code and a second code that is diversity-encoded from the first code are generated, and transmit symbols are spread with the first code and the second code. A first transmit symbol spread with the first code and a second transmit symbol spread with the second code are mapped to symbols in frequency and time domains in a frame and transmitted through antennas. Therefore, various diversity techniques can be provided to the mobile communication system, and the diversity technique is not restricted to symbols transmitted to the same mobile station and can also be applied to a 1-bit channel.

12 Claims, 9 Drawing Sheets

U.S. PATENT DOCUMENTS

| | | |
|---|---|---|
| 6,424,679 B1 | 7/2002 | Dabak et al. |
| 6,775,329 B2 | 8/2004 | Alamouti et al. |
| 6,816,557 B2 | 11/2004 | Kuchi et al. |
| 6,859,484 B2 * | 2/2005 | Okuyama .................... 375/130 |
| 7,400,687 B2 * | 7/2008 | Matsumoto et al. ......... 375/260 |
| 7,542,446 B2 * | 6/2009 | Mehta et al. ................. 370/330 |
| 2002/0018529 A1 * | 2/2002 | Dabak et al. ................. 375/267 |
| 2002/0044591 A1 * | 4/2002 | Lee et al. ..................... 375/130 |
| 2002/0131381 A1 * | 9/2002 | Kim et al. .................... 370/335 |
| 2002/0154705 A1 * | 10/2002 | Walton et al. ................ 375/267 |
| 2003/0002568 A1 * | 1/2003 | Dabak et al. ................. 375/148 |
| 2003/0003880 A1 * | 1/2003 | Ling et al. ...................... 455/92 |
| 2003/0026349 A1 * | 2/2003 | Onggosanusi et al. ....... 375/267 |
| 2003/0035491 A1 * | 2/2003 | Walton et al. ................ 375/267 |
| 2003/0125040 A1 * | 7/2003 | Walton et al. ................ 455/454 |
| 2003/0161282 A1 * | 8/2003 | Medvedev et al. ........... 370/329 |
| 2003/0235147 A1 | 12/2003 | Walton et al. |
| 2004/0116077 A1 | 6/2004 | Lee et al. |
| 2004/0165676 A1 * | 8/2004 | Krishnan et al. ............. 375/267 |
| 2004/0179626 A1 * | 9/2004 | Ketchum ...................... 375/265 |
| 2004/0185801 A1 | 9/2004 | Pauli et al. |
| 2004/0190599 A1 * | 9/2004 | Lim .............................. 375/144 |
| 2004/0213351 A1 * | 10/2004 | Shattil .......................... 375/260 |
| 2005/0174932 A1 | 8/2005 | Deng et al. |
| 2005/0281350 A1 | 12/2005 | Chae et al. |
| 2007/0036069 A1 * | 2/2007 | Wu et al. ...................... 370/208 |
| 2007/0213062 A1 * | 9/2007 | Medlock et al. ............. 455/436 |

OTHER PUBLICATIONS

ETRI, Consideration on Transmit Diversity and Multiplexing for DL Control Channels, TSG-RAN WG1 #42bis, Oct. 10-14, 2005.

Xiaodong Cai et al., "Multicarrier CDMA Systems with Transmit Diversity", IEEE 2000, pp. 2817-2821.

Sassan Iraji et al., "Interference Cancellation for Space-Time Block-Coded MC-CDMA Systems over Multipath Fading Channels", IEEE 2003, pp. 1104-1108.

International Search Report for PCT/KR2006/003333 dated Dec. 4, 2006.

Written Opinion dated December for PCT/KR2006/003333 dated Dec. 4, 2006.

* cited by examiner

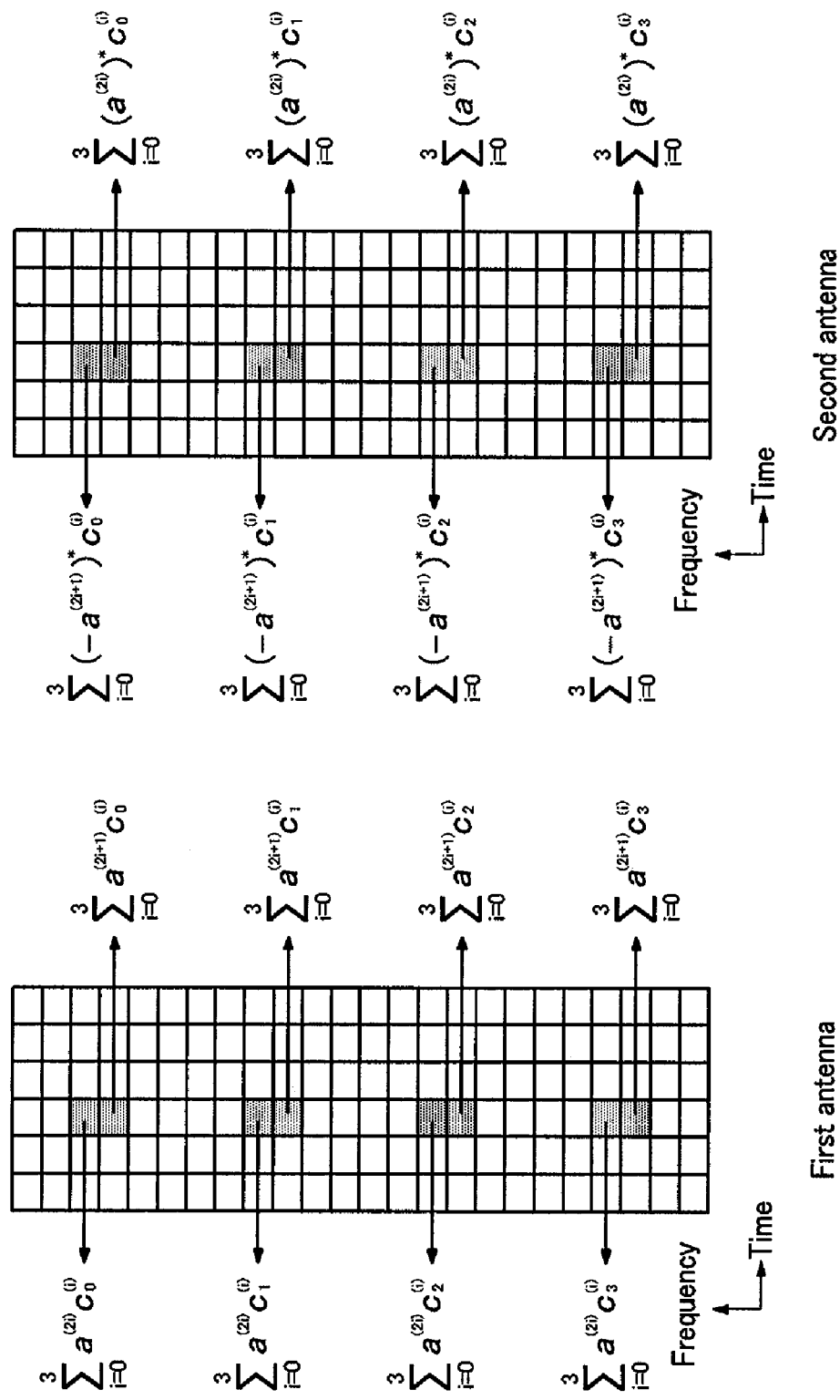

BASE STATION TRANSMITTER FOR MOBILE TELECOMMUNICATION SYSTEM, METHOD FOR THAT SYSTEM

TECHNICAL FIELD

The present invention relates to a transmit diversity method in a mobile communication system, and a transmitting unit of a base station.

BACKGROUND ART

As shown in FIG. 1, the present invention relates to a cellular system having an orthogonal frequency division multiplexing (OFDM)-based forward link and a multi-carrier code division multiple access (MC-CDMA)-based forward link diversity method thereof.

A transmit diversity scheme is used for compensating degradation of transmission quality due to fading. In this scheme, a fading effect can be mitigated by transmitting the same signals by using more than two methods and combining the transmitted signals at a receiving unit. A CDMA system may employ a time diversity scheme, a frequency diversity scheme, a cell diversity scheme, a space diversity scheme, and a path diversity scheme.

The time diversity means to repeatedly transmit the same signal at different times with an interval and combine the signals at a receiving end, and the frequency diversity means to transmit a signal on multiple frequencies. The cell diversity scheme forms a multi-path by simultaneously establishing connections between more than two different base stations, located where a mobile station is currently located and in a different cell to which the mobile station will move, and the path diversity scheme receives multi-path signals, demodulates the received signals in the receiving unit, and combines the demodulated signals. In addition, the spatial diversity uses multiple receive antennas and combines signals received through the receive antennas. According to the spatial diversity, more than two receive antennas are provided in the base station because it is difficult to install two antennas in the mobile station.

According to the conventional transmit diversity method, a space time block coding (STBC) proposed by Siavash M. Alamouti in IEEE Journal on select areas in communication in 1998 is applied to the MC-CDMA. That is, data is transmitted by performing diversity encoding in space (antenna) and time domains.

In a basic mode where the number of transmit antennas is 1, assume that a modulation symbol transmitted at a time slot t is $S_0$ and a modulation signal transmitted at a sequential time slot t+T is $S_1$. In this assumption, the modulation symbol $S_0$ is transmitted through the first antenna at the time slot t and a conjugate value (i.e., $S_0^*$) of the modulation symbol is $S_0$ transmitted through the second antenna at the adjacent time slot t+T according to a transmit diversity scheme that adopts the Alamouti's STBC encoding scheme.

The second symbol $S_1$ is transmitted through the second antenna at the time slot t and a negative conjugate value (i.e., $-S_1^*$) of the second symbol $S_1$ is transmitted through the first antenna at the adjacent time slot t+T. That is, the Alamouti's STBC encoding scheme obtains a diversity gain by transmitting the respective modulation symbols through different antennas at two consecutive time slots.

The prior art that applies the STBC scheme to the MC-CDMA performs transmission by STBC-encoding two adjacent modulation symbols and multiplying the same code sequence for each antenna.

That is, as shown in FIG. 2, modulation symbols $s_{2u}^{(i)}, s_{2u+1}^{(i)}$ of the i-th mobile station are STBC-encoded and transmitted by using the same code sequence for each antenna. In more detail, the i-th modulation symbol transmitted through the first transmit antenna is $s_{2u}^{(i)}$, and the i-th modulation symbol transmitted through the second antenna is $(-s_{2u+1}^{(i)})^*$ during the 2u-th OFDM symbol period. In addition, during the adjacent (2$_u$+1)-th OFDM symbol period, the i-th modulation symbol transmitted through a first antenna is $s_{2u+1}^{(i)}$ and the i-th modulation symbol transmitted through a second antenna is $(s_{2u}^{(i)})^*$. As described, x* is a complex conjugate of x.

An encoded modulation symbol for the i-th mobile station is spread with a MC-CDMA orthogonal code $c^{(i)} = [c_0^{(i)} c_1^{(i)} c_2^{(i)}, \ldots, c_{N-1}^{(i)}]^T$ allocated to the i-th mobile station, and combined with a signal of a different mobile station in each symbol period and transmitted through each antenna.

However, according to the conventional diversity technique, the STBC encoding is performed only between adjacent symbols among symbols transmitted to the same mobile station in the MC-CDMA system. Therefore, a diversity technique that is not restricted to symbols transmitted to the same mobile station is needed, and a variety of the diversity techniques also needs to be increased.

Particularly, it is difficult to apply the diversity technique to a 1 bit channel when the STBC encoding is performed between adjacent symbols.

The above information disclosed in this Background section is only for enhancement of understanding of the background of the invention and therefore it may contain information that does not form the prior art that is already known in this country to a person of ordinary skill in the art.

DISCLOSURE

Technical Problem

Accordingly, the present invention has been made in an effort to provide various diversity techniques for a multiple access-based forward link channel. In addition, the present invention provides a diversity technique that is not restricted to symbols transmitted to the same mobile station. Further, the present invention provides a diversity technique that can be applied to a 1-bit channel.

Technical Solution

A transmit diversity method according to one embodiment of the present invention is provided to a mobile communication system. The transmit diversity method includes a) generating a first code and a second code and spreading a target symbol with the first and second codes, wherein the second code is generated by diversity-encoding the first code; and b) mapping a first transmit symbol spread with the first code and a second transmit symbol spread with the second code to symbols of a frame in time and frequency domains and transmitting them through antennas.

A transmit diversity method according to another embodiment of the present invention is provided to a mobile communication system. The transmit diversity method includes a) encoding an input symbol to a first symbol, diversity-encoding the first code to a second symbol, and outputting the first and second symbols; b) outputting a first transmit symbol and a second transmit symbol respectively generated by spreading the first symbol and the second symbol with orthogonal codes; and c) mapping the first transmit symbol and the second transmit symbol to symbols in a frame in frequency and time domains and transmitting the symbols through antennas.

A base station transmitting apparatus according to another embodiment of the present invention is provided to a mobile communication system. The base station transmitting apparatus includes an orthogonal code generator, a code sequence diversity encoding block, a spreading block, and a symbol mapping block. The orthogonal code generator generates an orthogonal code. The code sequence diversity encoding block performs diversity encoding on the orthogonal code. The spreading block spreads a first code generated from the orthogonal code generator and a second code generated by diversity-encoding the first code and outputs a first transmit symbol and a second transmit symbol. The symbol mapping block maps the first and second transmit symbols to symbols in a frame in a time domain or in a frequency domain and transmits the mapped symbols through antennas.

A base station transmitting apparatus according to another embodiment of the present invention is provided to a mobile communication system. The base station transmitting apparatus includes a diversity encoder, an orthogonal code generator, a spreader, and a symbol mapping block. The diversity encoder performs diversity encoding on an input symbol. The orthogonal code generator generates an orthogonal code. The spreader spreads a first symbol and a second symbol that is diversity-encoded from the first symbol with the orthogonal code, respectively, and outputs a first transmit symbol and a second transmit symbol. The symbol mapping block maps the first and second transmit symbols to symbols in frequency and time domains in a frame and transmits the mapped symbols through antennas.

Advantageous Effects

According to the present invention, the mobile communication system according to the embodiments of the present invention provides a variety of diversity techniques for a forward link channel.

In addition, the diversity techniques can be applied to symbols not only transmitted to the same mobile station but also transmitted to a plurality of different mobile stations.

That is, the various diversity techniques can be applied not only to the symbols transmitted to the same mobile station but also to a 1-bit channel transmitted to the plurality of mobile stations, thereby increasing variety and efficiency of the diversity techniques.

DESCRIPTION OF DRAWINGS

FIG. 4 to FIG. 6, FIG. 8, and FIG. 9 respectively show a transmit diversity scheme according to the exemplary embodiment of the present invention.

BEST MODE

An exemplary embodiment of the present invention will hereinafter be described in detail with reference to the accompanying drawings.

Figure 1:
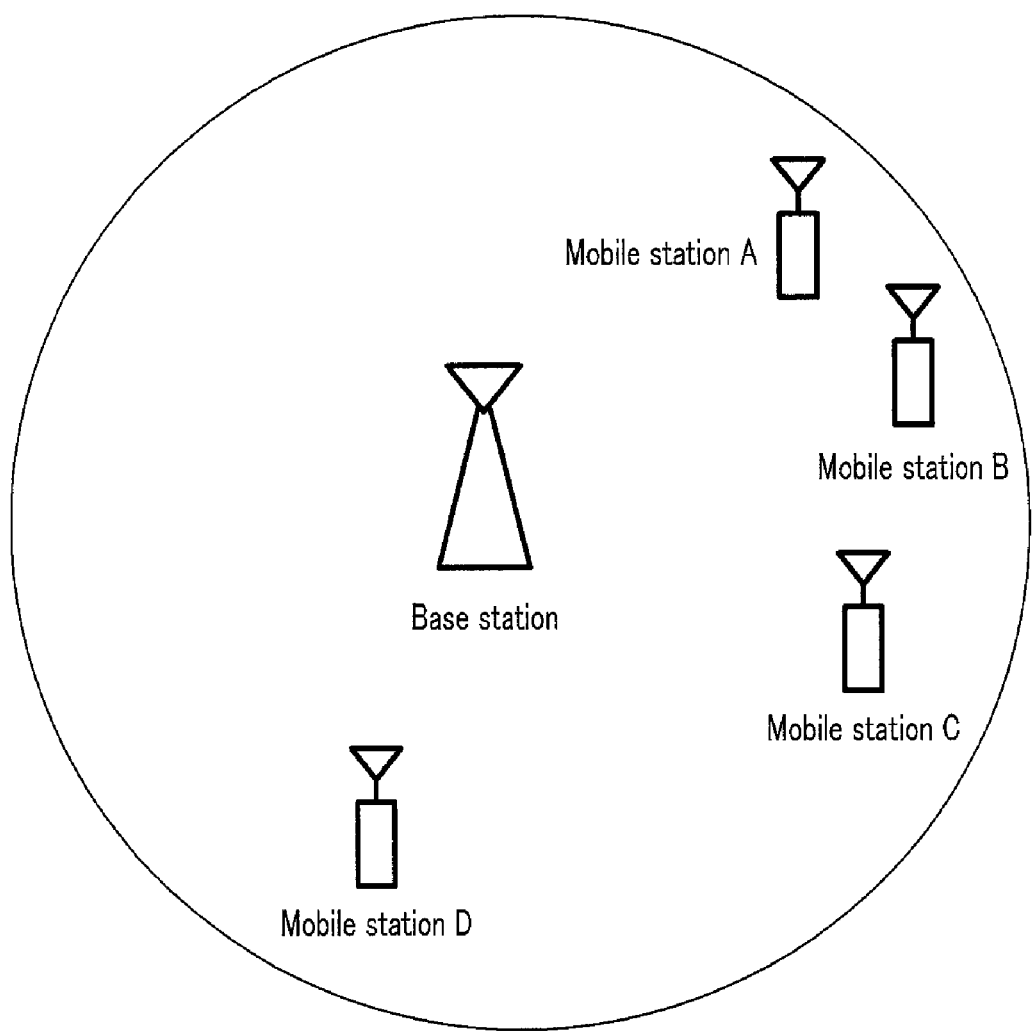
FIG. 1 shows a configuration of a cellular system.
Figure 2:
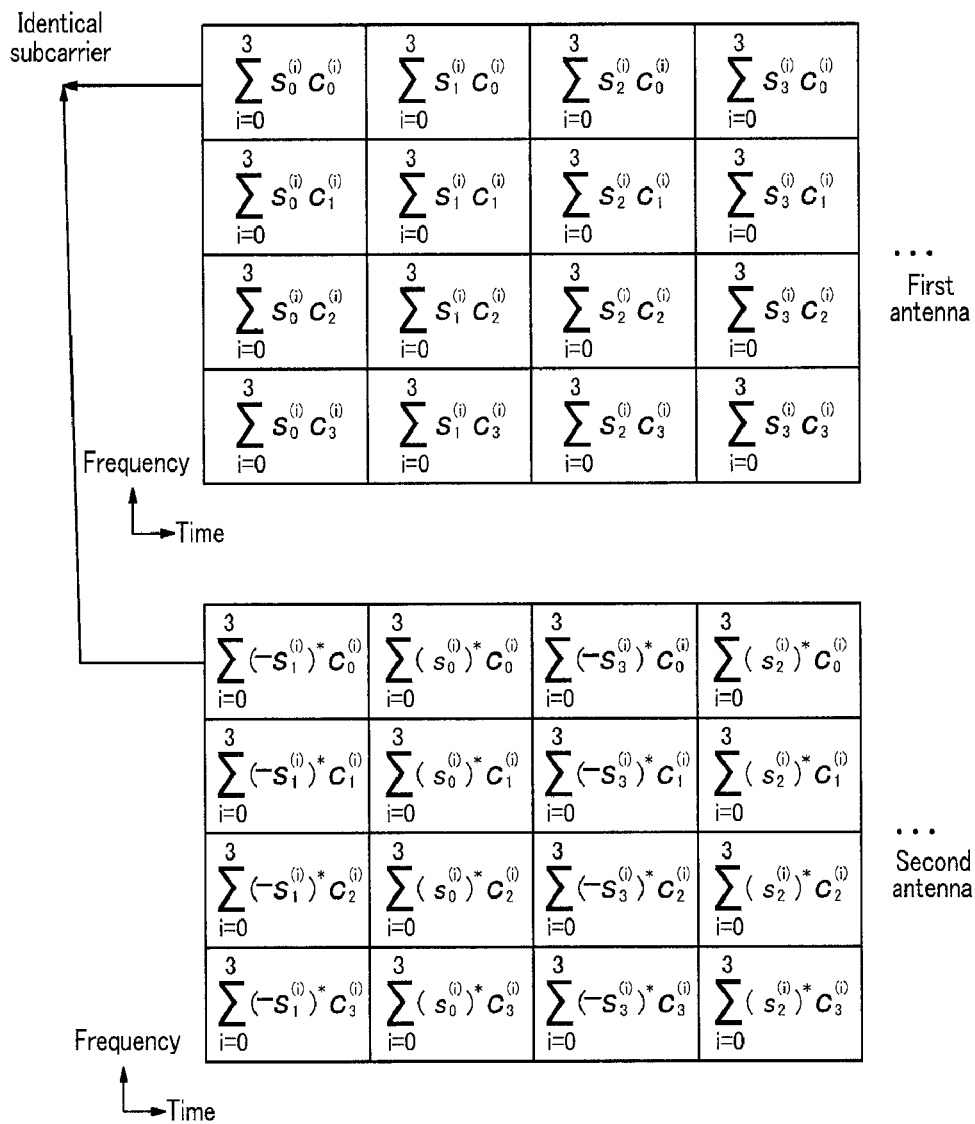
FIG. 2 shows a conventional diversity scheme.
Figure 3:
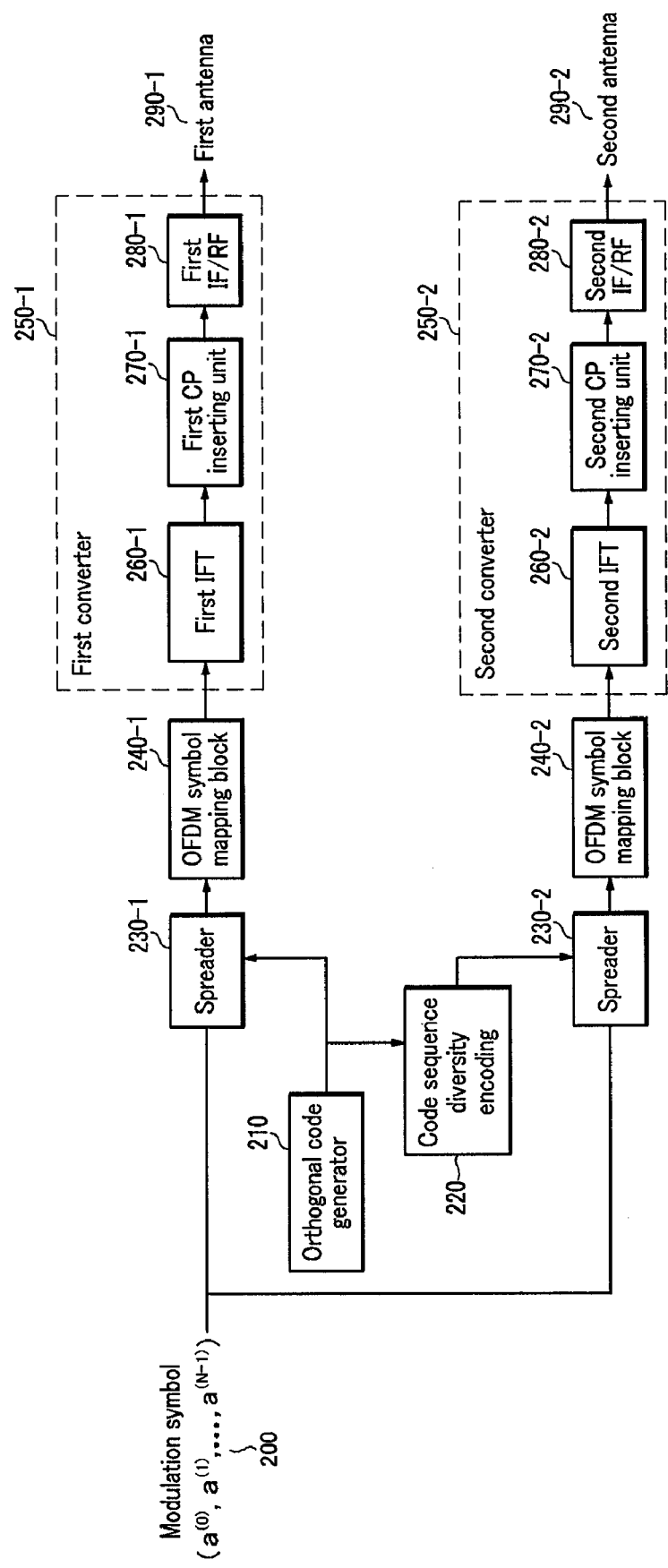
FIG. 3 and FIG. 7 respectively shows a configuration of a base station transmitting apparatus that performs a transmit diversity scheme according to an exemplary embodiment of the present invention.

FIG. 3 is a configuration view of a base station transmitting apparatus that performs a forward link diversity technique according to an exemplary embodiment of the present invention.

The base station transmitting apparatus includes a first antenna 290-1, a second antenna 290-2, an orthogonal code generating block 210 for generating an orthogonal code, and a code sequence diversity encoding block 220 for performing transmit diversity encoding oil the orthogonal code.

The base station transmitting apparatus further includes a first spreading block 230-1, a second spreading block 230-2, a first OFDM symbol mapping block 240-1, a second OFDM symbol mapping block 240-2, a first converter 250-1, and a second converter 250-2. The first spreading block 230-1 is provided for a first antenna path, and receives an output of the orthogonal code generating block 210 and a modulation signal 200 as an input and spreads the modulation symbol. The second spreading block 230-2 is provided for a second antenna path, and receives an output of the code diversity encoding block 220 and a modulation symbol 200 as an input and spreads the modulation symbol 200. The first and second OFDM symbol mapping blocks 240-1 and 240-2 respectively map outputs of the first and second spreading blocks 230-1 and 230-2 to the corresponding OFDM sub-carrier and the corresponding symbol period.

The first and second converters 250-1 and 250-2 respectively convert outputs of the first and second OFDM symbol mapping blocks 240-1 and 240-2 to a radio frequency (RF) signal in a time domain. In this case, the first converter 250-1 and the second converter 250-2 respectively include a first invert Fourier transform (IFT) 260-1, a second IFT 260-2, a first cyclic prefix (CP) inserting unit 270-1, a second CP inserting unit 270-2, a first IF/RF block 280-1, and a second IF/RF block 280-2.

In this case, N modulation symbols 200 may be data symbols transmitted to one mobile station or several different mobile stations. For example, in the case of the bit of Ack/Nak, the N modulation symbols may be respectively allocated to different mobile stations. In addition, the N modulation symbols may respectively correspond to a binary phase shift key (BPSK) modulation symbol, a quadrature phase shift key (QPSK) modulation symbol, a M-ary amplitude modulation symbol, a quadrature amplitude modulation (QAM) symbol, or zero.

The orthogonal code generating block 210 generates N orthogonal codes, each having the length of N, and the orthogonal code can be represented as given as Equation 1.

$$c^{(0)} = [c_0^{(0)} c_1^{(0)} c_2^{(0)}, \ldots, c_{N-2}^{(0)} c_{N-1}^{(0)}]^T \quad \text{[Equation 1]}$$
$$c^{(1)} = [c_0^{(1)} c_1^{(1)} c_2^{(1)}, \ldots, c_{N-2}^{(1)} c_{N-1}^{(1)}]^T$$
$$\vdots$$
$$c^{(N-1)} = [c_0^{(N-1)} c_1^{(N-1)} c_2^{(N-1)}, \ldots, c_{N-2}^{(N-1)} c_{N-1}^{(N-1)}]^T$$

In Equation 1, each code symbol $c_u^{(i)}$ of the N code sequences may have a complex value or a real value.

The code sequence diversity encoding block 220 performs transmit diversity encoding on an output of the orthogonal code generating block 210 for each adjacent code chip. In other words, the $2_u$-th and $2_{u+1}$-th code chips $C_{2u}^i$ and $C_{2u+1}^i$ of the i-th orthogonal code among the outputs of the orthogonal code generating block 210 are respectively output as $(-C_{2u+1}^{(i)})^*$ and $(C_{2u}^{(i)})^*$ by the code sequence diversity encoding block 220. Therefore, the outputs of the code sequence diversity encoding block 220 can be obtained by Equation 2.

$$c_{en}^{(0)} = \left[-c_1^{(0)*} c_0^{(0)*} - c_3^{(0)*} \ldots - c_{N-1}^{(0)*} c_{N-2}^{(0)*}\right]^T \quad \text{[Equation 2]}$$

$$c_{en}^{(1)} = \left[-c_1^{(1)*} c_0^{(1)*} - c_3^{(1)*} \ldots - c_{N-1}^{(1)*} c_{N-2}^{(1)*}\right]^T$$

$$\vdots$$

$$c_{en}^{(N-1)} = \left[-c_1^{(N-1)*} c_0^{(N-1)*} - c_3^{(N-1)*} \ldots - c_{N-1}^{(N-1)*} c_{N-2}^{(N-1)*}\right]^T$$

The first spreading block 230-1 receives the N modulation symbols 200, spreads them with N orthogonal code sequences obtained from the output of the orthogonal code generating block 210, respectively, adds the spread symbols per chip, and outputs the added result. N symbols output from the first spreading block 230-1 of the first antenna path can be represented as given in Equation 3.

$$S^{(a0)} = [s_0^{(a0)} s_1^{(a0)} s_2^{(a0)} \ldots s_{N-2}^{(a0)} s_{N-1}^{(a0)}]^T \quad \text{[Equation 3]}$$

In this case, a0 denotes a first antenna, and the u-th symbol $s_u^{(a0)}$ can be represented as given in Equation 4.

$$S_u^{(a0)} = \sum_{i=0}^{N-1} a^{(i)} c_u^{(i)} \quad \text{[Equation 4]}$$

($a^{(i)}$: a symbol input to the spreading block,
$c_u$: u-th orthogonal code sequence)

The second spreading block 230-2 of the second antenna path receives N modulation symbols 200, spreads the respective symbols with N orthogonal code sequences output from the orthogonal code sequence diversity encoding block of Equation 2, combines the spread symbols per chip, and outputs the combination result. That is, the N output symbols of the second spreading block 230-2 of the second antenna path can be represented as given in Equation 5.

$$S^{(a1)} = [s_0^{(a1)} s_1^{(a1)} s_2^{(a1)} \ldots s_{N-2}^{(a1)} s_{N-1}^{(a1)}]^T \quad \text{[Equation 5]}$$

where a1 denotes a second antenna, and the u-th symbol $s_u^{(a1)}$ can be represented as given in Equation 6.

$$S_u^{(a1)} = \sum_{i=0}^{N-1} a^{(i)} (-c_{u+1}^{(i)})^*, \quad \text{[Equation 6]}$$

when u is an even number, including 0 (u=0, 2, 4, . . . )

$$S_u^{(a1)} = \sum_{i=0}^{N-1} a^{(i)} (c_{u-1}^{(i)})^*,$$

when u is an odd number (1, 3, 5, . . . )
($a^{(i)}$: a symbol input to the spreading block,
$c^u$: the u-th orthogonal code sequence)

Outputs of the first and second spreading blocks 230-1 and 230-2 are input to the first OFDM symbol mapping block 240-1 and the second OFDM symbol mapping block 240-2 provided for each antenna path.

Figure 4:
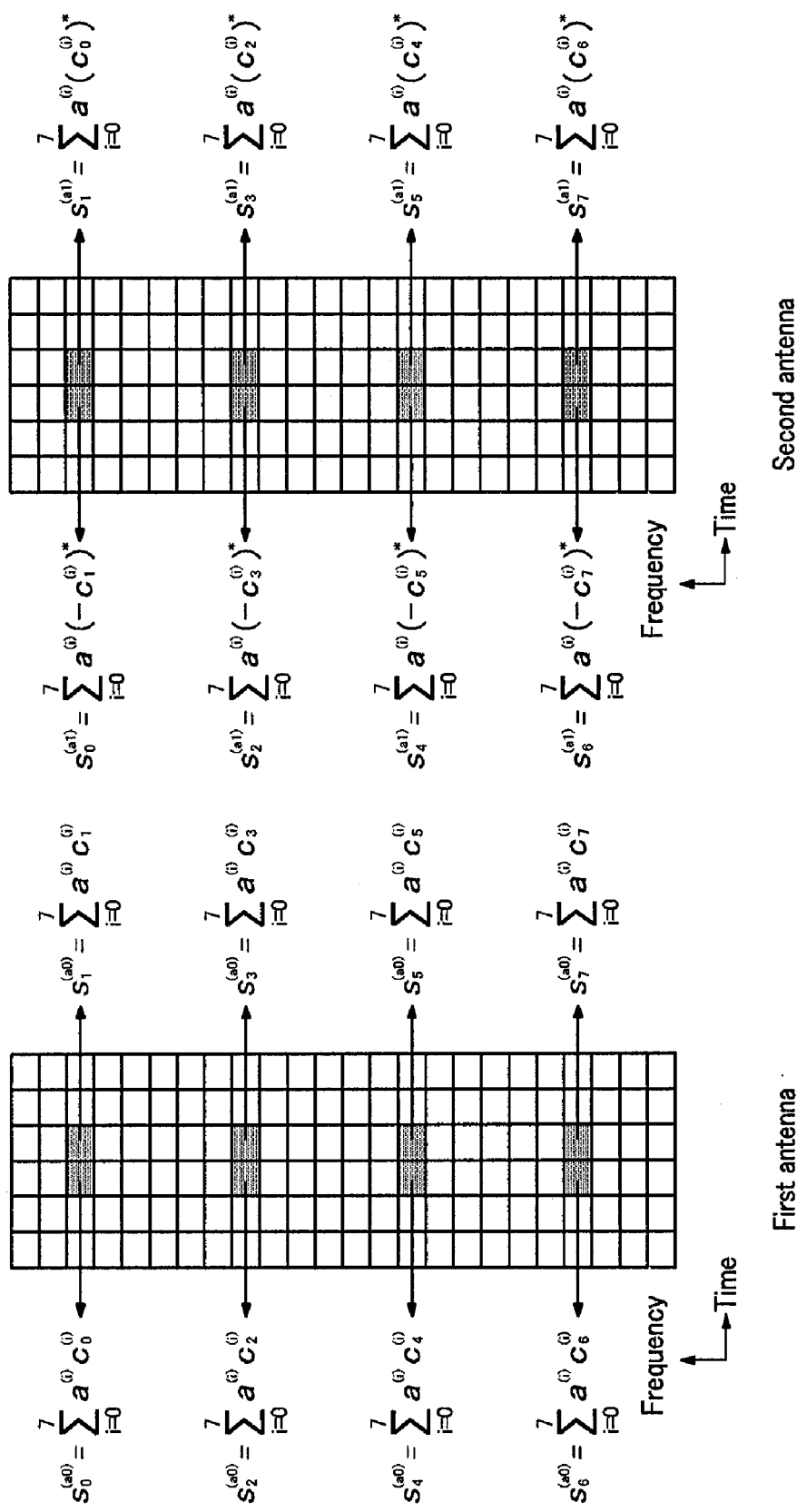
Figure 5:
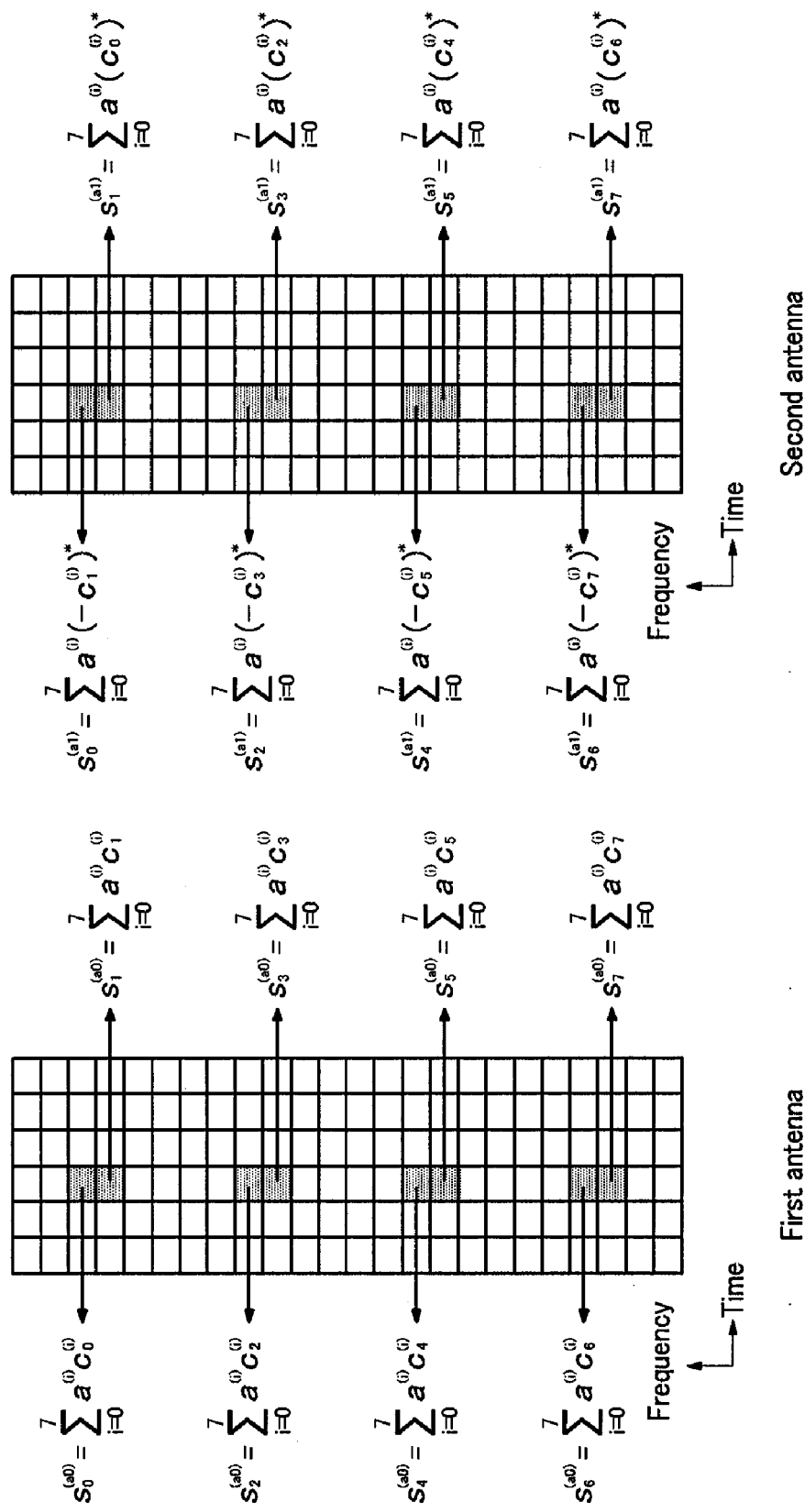

In more detail, as shown in FIG. 4 and FIG. 5, the first OFDM symbol mapping block 240-1 and the second OFDM symbol mapping block 240-2 map outputs of the spreading blocks of Equation 3 and Equation 5 to symbols in OFDM frames in the time and frequency domains. FIG. 4 and FIG. 5 exemplarily show OFDM symbol mapping for transmit diversity in the case that the length N of the orthogonal code sequence is 8.

In addition, as shown in FIG. 4 and FIG. 5, a location of the symbol transmitted to the first antenna must be the same as that of a symbol transmitted to the second antenna during the OFDM symbol mapping. That is, locations of the frequency and time domains of the u-th symbol $s_u^{(a0)}$ of the first antenna must be the same as locations of the frequency and time domains of and the u-th symbol $s_u^{(a1)}$ of the second antenna.

In addition, when the symbol mapping is performed for each antenna, two adjacent symbols $s_{2u}^{(a0)}$ $s_{2u+1}^{(a0)}$ and $s_{2u}^{(a1)}$ $s_{2u+1}^{(a1)}$ must be mapped to two adjacent OFDM symbols in the time axis as shown in FIG. 4 or mapped to adjacent symbols in the frequency axis as shown in FIG. 5. As described, two adjacent symbols must be mapped to adjacent symbols because a receiving unit of the mobile station can distinguish signals from two transmit antennas when phases and amplitudes of a fading channel of the two symbols $s_{2u}^{(a0)}$ $s_{2u+1}^{(a0)}$ or $s_{2u}^{(a1)}$ $s_{2u+1}^{(a1)}$ are identical.

In this case, as shown in FIG. 4, diversity encoding of a code sequence allocated to adjacent OFDM symbol periods in the time domain is called STBC encoding for the code sequence, and diversity encoding of a code sequence applied to adjacent subcarriers in the frequency domain is called SFBC encoding for the code sequence as shown in FIG. 5.

That is, when performing the STBC encoding, the STBC-encoded symbols must be transmitted at adjacent locations in the time axis, and the SFBC encoded-symbols must exist in adjacent subcarriers. This is because that amplitude or phase remains constant when passing a radio channel in the case that the symbols are in the adjacent locations. The amplitude and phase vary as a distance between symbols is increased, causing difficulty in modulation.

Figure 6:
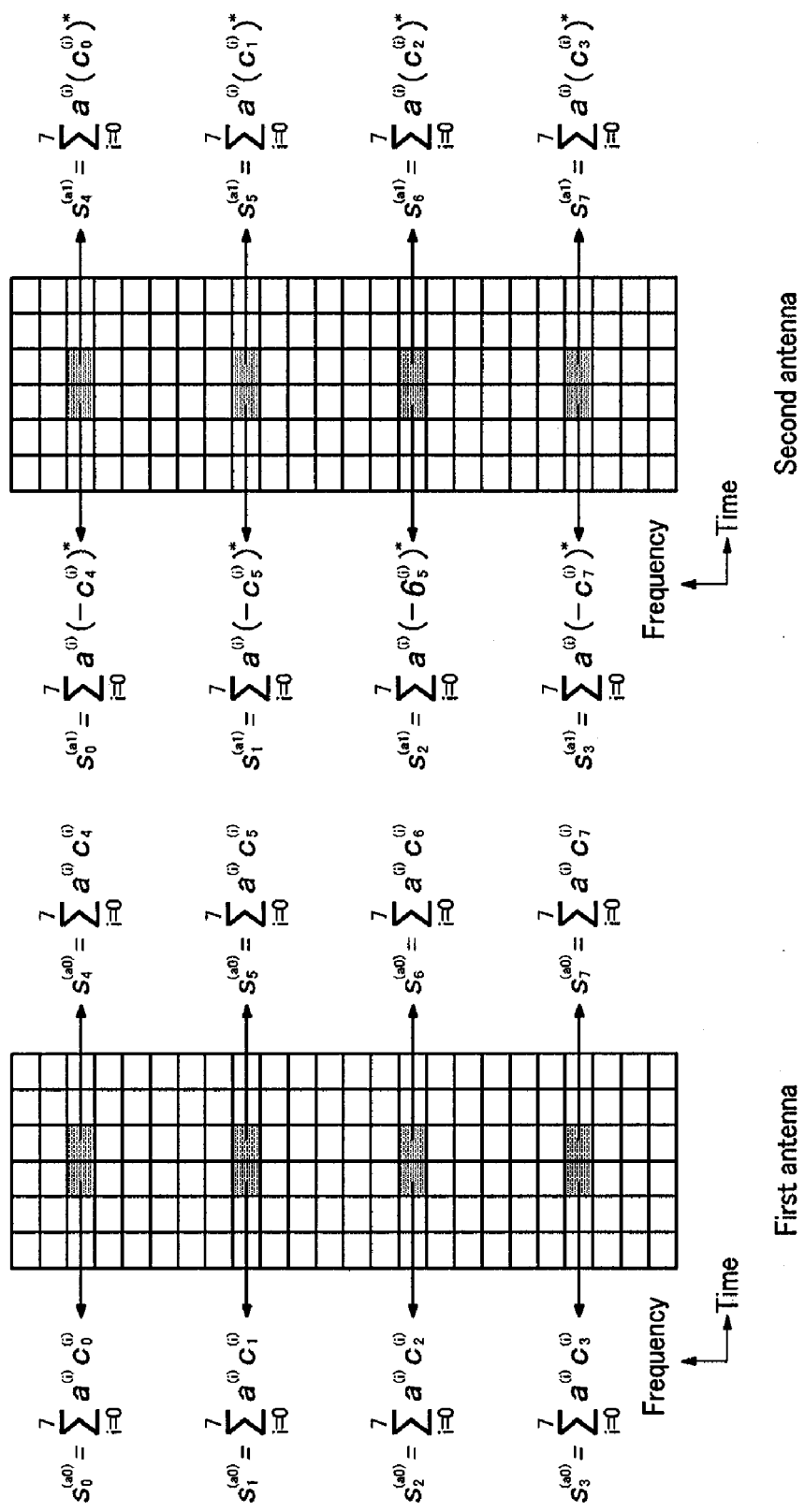

According to another exemplary embodiment of the present invention, outputs of the first and second OFDM symbol mapping blocks 240-1 and 240-2 can be configured as shown in FIG. 6.

In more detail, an output of the code sequence diversity encoding block 220 is configured as given in Equation 7.

$$c_{en}^{(0)} = \left[-c_{N/2}^{(0)*} - c_{N/2+1}^{(0)*} \ldots - c_{N-1}^{(0)*} c_0^{(0)*} c_1^{(0)*} \ldots c_{N/2-1}^{(0)*}\right]^T \quad \text{[Equation 7]}$$

$$c_{en}^{(1)} = \left[-c_{N/2}^{(1)*} - c_{N/2+1}^{(1)*} \ldots - c_{N-1}^{(1)*} c_0^{(1)*} c_1^{(1)*} \ldots c_{N/2-1}^{(1)*}\right]^T$$

$$\vdots$$

$$c_{en}^{(N-1)} = \left[-c_{N/2}^{(N-1)*} - c_{N/2+1}^{(N-1)*} \ldots - c_{N-1}^{(N-1)*} c_0^{(N-1)*} c_1^{(N-1)*} \ldots c_{N/2-1}^{(N-1)*}\right]^T$$

In this case, an output of the first spreading block 230-1 of the first antenna path is given as Equation 3. In addition, an output of the second spreading block 230-2 of the second antenna path is given as Equation 8, derived from Equation 7.

$$S^{(a1)} = [s_0^{(a1)} s_1^{(a1)} s_2^{(a1)} \ldots s_{N-2}^{(a1)} s_{N-1}^{(a1)}]^T \quad \text{[Equation 8]}$$

where $$S_u^{(a1)} = \sum_{i=0}^{N-1} a^{(i)} (-c_{N/2+u}^{(i)})^*,$$

when u<N/2

$$= \sum_{i=0}^{N-1} a^{(i)} (c_{u-N/2}^{(i)})^*,$$

when N/2≦u

The first OFDM symbol mapping block 240-1 and the second OFDM symbol mapping block 204-2 map the u-th symbol and the (u+N/2)-th symbol to adjacent OFDM symbol periods of the same subcarrier frequency.

That is, in the case of the first antenna, $s_u^{(a0)} s_{u+N/2}^{(a0)}$ of Equation 3 are mapped to the adjacent OFDM symbol periods in the time axis of the same subcarrier, and in the case of the second antenna, $s_u^{(a1)} s_{u+N/2}^{(a1)}$ of Equation 8 are mapped to the adjacent OFDM symbol periods in the time axis of the same subcarrier.

Herein, although it is not shown, the first OFDM symbol mapping block 240-1 and the second OFDM symbol mapping block 240-2 may map the u-th symbol and the (u+N/2)-th symbol to adjacent OFDM symbol periods in the frequency axis.

That is, for the first antenna, $s_u^{(a0)} s_{u+N/2}^{(a0)}$ of Equation 3 may be mapped to adjacent OFDM symbol periods in the frequency axis, and for the second antenna, $s_u^{(a1)} s_{u+N/2}^{(a1)}$ of Equation 8 may be mapped to the adjacent OFDM symbol periods in the frequency axis.

Figure 7:
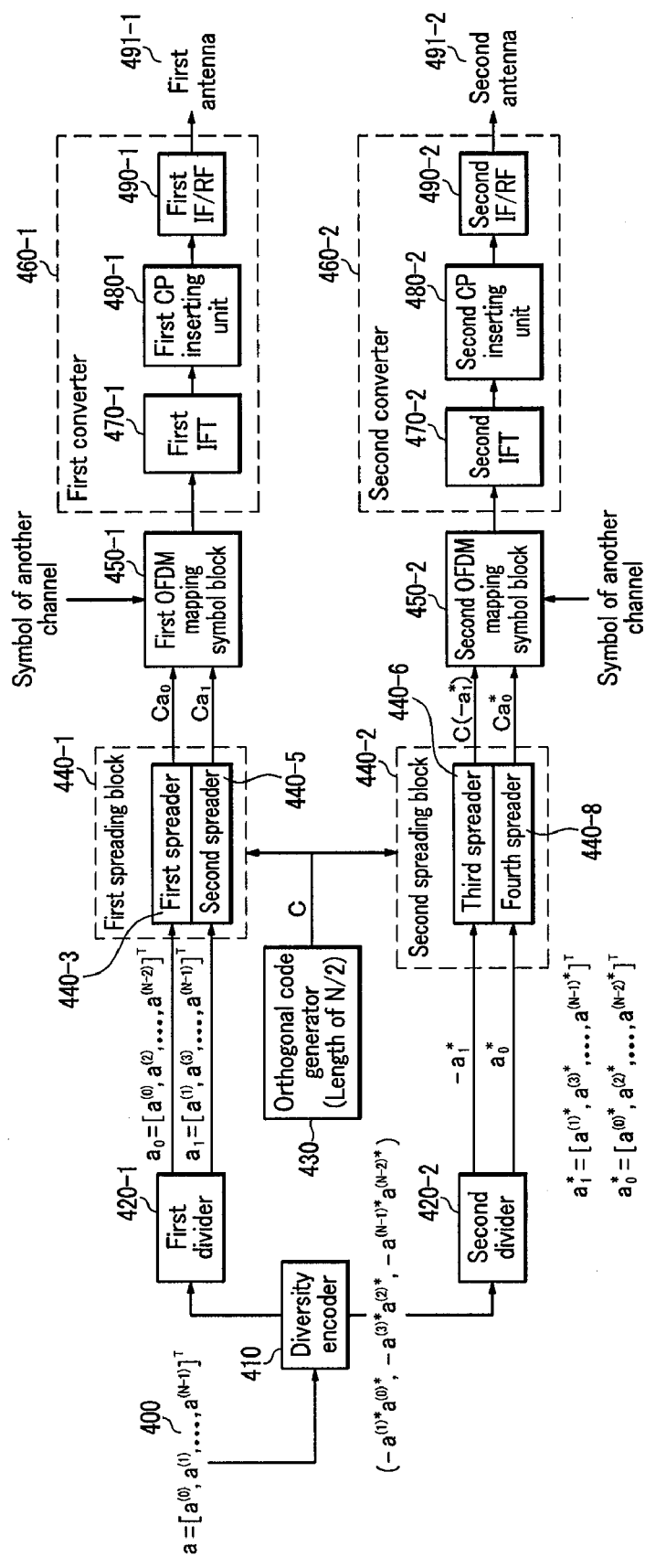

FIG. 7 shows a base station transmitting apparatus according to another embodiment of the present invention.

The base station transmitting apparatus includes a diversity encoder 410, an orthogonal code generator 430, a first antenna 491-1, a second antenna 491-2, a first divider 420-1, a second divider 420-2, a first spreading block 440-1, a second spreading block 440-2, a first OFDM symbol mapping block 450-1, and a second OFDM symbol mapping block 450-2. The first and second dividers 420-1 and 420-2 are respectively connected with a first antenna path and a second antenna path. In this case, the first spreading block 440-1 may include a first spreader 440-3 and a second spreader 440-5, and the second spreading block 440-2 may include a third spreader 440-6 and a fourth spreader 440-8.

The base station transmitting apparatus includes a first converter 460-1 and a second converter 460-2 for converting outputs of the OFDM symbol mapping blocks 450-1 and 450-2 to RF signals of the time domain, respectively. The first converter 460-1 and the second converter 460-2 may respectively include a first Inverse Fourier transform (IFT) 470-1, a second IFT 470-2, a first CP inserting unit 480-1, a second CP inserting unit 480-2, a first IF/RF block 490-1, and a second IF/RF block 490-2.

The base station transmitting apparatus in the exemplary embodiment performs STBC encoding or SFBC encoding on an input data symbol 400. In this case, N input data symbols 400 may be transmitted to one mobile station, or transmitted to different mobile stations, respectively. For example, when the symbols are provided as an ACK symbol or NACK symbol for uplink packet users, the N input data symbols are respectively transmitted to different mobile stations.

The diversity encoder 410 receives N input symbols and outputs STBC-encoded or SFBC-encoded symbols corresponding to each antenna. In this case, a symbol row ($a^{(0)}$, $a^{(1)}$, ..., $a^{(N-1)}$) is output through the first antenna path 491-1, and a symbol row ($-a^{(1)*}$, $a^{(0)*}$, $-a^{(3)*}$, $a^{(2)*}$, ..., $-a^{(N-2)*}$, $a^{(N-1)*}$) is output through the second antenna 491-2.

The N input symbols may have a value of 0, a real number, or a complex number. For example, when the N input symbols are used as ACK/NACK channels for transmitting a downlink ACK/NACK, the N input symbols may have a value of 1(ACK), −1(NACK), or 0. In this case, 0 may imply that no user is using an uplink packet data channel that corresponds to the ACK/NACK symbol.

In addition, N symbols for each diversity-encoded antenna path are input to the first divider 420-1 and the second divider 420-2, and the first and second dividers 420-1 and 420-2 distribute the input symbols. For example, the first divider 420-1 or the second divider 420-2 may divide even-numbered symbols and odd-numbered symbols, and output accordingly.

The orthogonal code generator 430 simultaneously provides N/2 orthogonal codes, each having the length of N/2, to the spreaders 440-3, 440-5, 440-6 and 440-8 of the respective paths. In this case, the length of N/2 implies that the length of the orthogonal code corresponds to a half of N resource blocks allocated to each frame.

The spreaders 440-3, 440-5, 440-6, and 440-8 spread outputs of the first and second dividers 420-1 and 420-2 for each antenna path with orthogonal codes generated from the orthogonal code generator 430. When the dividers 420-1 and 420-2 outputs the input symbols into odd-numbered symbols and even-numbered symbols, outputs of the first and second spreaders 440-3 and 440-5 on the first antenna path can be obtained by Equation 9 and Equation 10.

$$Ca_0 = \begin{bmatrix} c_0^{(0)} c_0^{(1)} \dots c_0^{(\frac{N}{2}-1)} \\ c_1^{(0)} c_1^{(1)} \dots c_1^{(\frac{N}{2}-1)} \\ \vdots \\ c_{\frac{N}{2}-1}^{(0)} c_{\frac{N}{2}-1}^{(1)} \dots c_{\frac{N}{2}-1}^{(\frac{N}{2}-1)} \end{bmatrix} \begin{bmatrix} a^{(0)} \\ a^{(2)} \\ \vdots \\ a^{(N-2)} \end{bmatrix} = \begin{bmatrix} \sum_{i=0}^{\frac{N}{2}-1} c_0^{(i)} a^{(2i)} \\ \sum_{i=0}^{\frac{N}{2}-1} c_1^{(i)} a^{(2i)} \\ \vdots \\ \sum_{i=0}^{\frac{N}{2}-1} c_{\frac{N}{2}-1}^{(i)} a^{(2i)} \end{bmatrix} \quad \text{[Equation 9]}$$

$$Ca_1 = \begin{bmatrix} c_0^{(0)} c_0^{(1)} \dots c_0^{(\frac{N}{2}-1)} \\ c_1^{(0)} c_1^{(1)} \dots c_1^{(\frac{N}{2}-1)} \\ \vdots \\ c_{\frac{N}{2}-1}^{(0)} c_{\frac{N}{2}-1}^{(1)} \dots c_{\frac{N}{2}-1}^{(\frac{N}{2}-1)} \end{bmatrix} \begin{bmatrix} a^{(1)} \\ a^{(3)} \\ \vdots \\ a^{(N-1)} \end{bmatrix} = \begin{bmatrix} \sum_{i=0}^{\frac{N}{2}-1} c_0^{(i)} a^{(2i+1)} \\ \sum_{i=0}^{\frac{N}{2}-1} c_1^{(i)} a^{(2i+1)} \\ \vdots \\ \sum_{i=0}^{\frac{N}{2}-1} c_{\frac{N}{2}-1}^{(i)} a^{(2i+1)} \end{bmatrix} \quad \text{[Equation 10]}$$

In addition, outputs of the third and fourth spreaders 440-6 and 440-8 of the second antenna path can be obtained by Equation 11 and Equation 12.

$$C(-a_1)^* = \begin{bmatrix} c_0^{(0)} c_0^{(1)} \cdots c_0^{(\frac{N}{2}-1)} \\ c_1^{(0)} c_1^{(1)} \cdots c_1^{(\frac{N}{2}-1)} \\ \vdots \\ c_{\frac{N}{2}-1}^{(0)} c_{\frac{N}{2}-1}^{(1)} \cdots c_{\frac{N}{2}-1}^{(\frac{N}{2}-1)} \end{bmatrix} \begin{bmatrix} -(a^{(1)})^* \\ -(a^{(3)})^* \\ \vdots \\ -(a^{(N-1)})^* \end{bmatrix} = \begin{bmatrix} \sum_{i=0}^{\frac{N}{2}-1} c_0^{(i)} (-a^{(2i+1)})^* \\ \sum_{i=0}^{\frac{N}{2}-1} c_1^{(i)} (-a^{(2i+1)})^* \\ \vdots \\ \sum_{i=0}^{\frac{N}{2}-1} c_{\frac{N}{2}-1}^{(i)} (-a^{(2i+1)})^* \end{bmatrix}$$

[Equation 11]

$$Ca_0^* = \begin{bmatrix} c_0^{(0)} c_0^{(1)} \cdots c_0^{(\frac{N}{2}-1)} \\ c_1^{(0)} c_1^{(1)} \cdots c_1^{(\frac{N}{2}-1)} \\ \vdots \\ c_{\frac{N}{2}-1}^{(0)} c_{\frac{N}{2}-1}^{(1)} \cdots c_{\frac{N}{2}-1}^{(\frac{N}{2}-1)} \end{bmatrix} \begin{bmatrix} (a^{(0)})^* \\ (a^{(3)})^* \\ \vdots \\ (a^{(N-1)})^* \end{bmatrix} = \begin{bmatrix} \sum_{i=0}^{\frac{N}{2}-1} c_0^{(i)} (a^{(2i)})^* \\ \sum_{i=0}^{\frac{N}{2}-1} c_1^{(i)} (a^{(2i)})^* \\ \vdots \\ \sum_{i=0}^{\frac{N}{2}-1} c_{\frac{N}{2}-1}^{(i)} (a^{(2i)})^* \end{bmatrix}$$

[Equation 12]

Herein, C of Equation 9 to Equation 12 denotes an $$\frac{N}{2} \times \frac{N}{2}$$

orthogonal code matrix.

Figure 8:
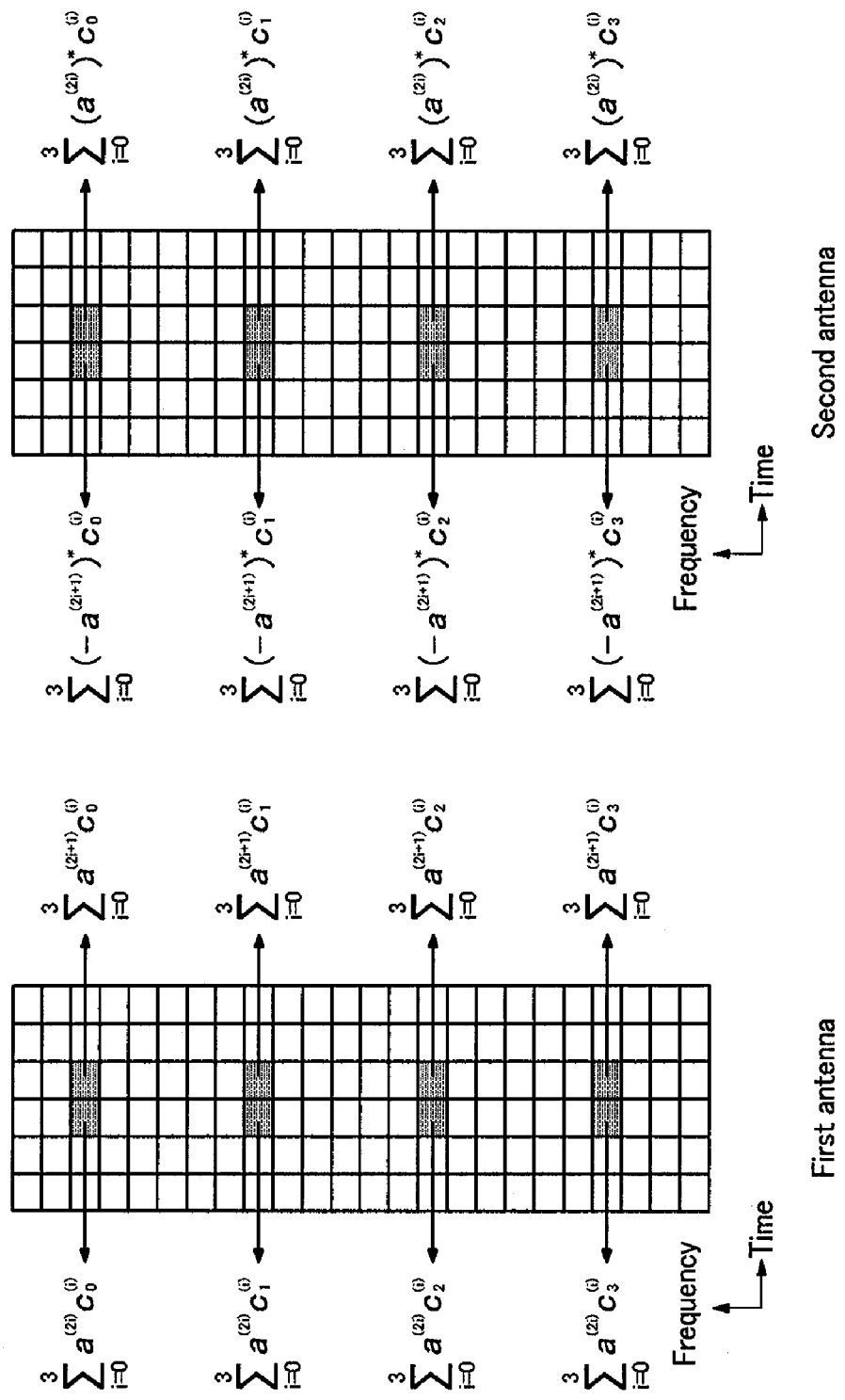

The first OFDM symbol mapping block 450-1 and the second OFDM symbol mapping block 450-2 map the outputs of the spreaders 440-3, 440-5, 440-6, and 440-8 to the corresponding OFDM symbol periods in the time-frequency domain respectively, and a detailed mapping method is as shown in FIG. 8 and FIG. 9.

As shown in FIG. 8, for the first antenna path and the second antenna path, outputs $Ca_0$ and $Ca_1$ of the first and second spreaders and outputs $C(-a_1)^*$ and $C(a_0)^*$ of the third and fourth spreaders can be arranged adjacent in a time domain in a frame of the frequency and time domains. That is, the first OFDM symbol mapping block 450-1 and the second OFDM symbol mapping block 450-2 may arrange elements of the same location of two column vectors in adjacent OFDM symbol periods in the time domain such that the two column vectors can be adjacently arranged on the time axis.

As shown in FIG. 9, the first OFDM symbol mapping block 450-1 and the second OFDM symbol mapping block 450-2 may arrange elements of the same location of two column vectors in adjacent OFDM symbol periods in the frequency domain such that the two column vectors can be adjacently arranged on the frequency axis. In this case, superior performance can be achieved in an environment where demodulation delay is short and the speed of a mobile station is high.

In this case, elements of a column vector at different locations must be separated from each other farther than a channel interference band for a frequency diversity gain.

The first inverse Fourier transform (IFT) 470-1 and the second IFT 470-2 receive outputs of the first and second OFDM symbol mapping blocks 450-1 and 450-2 and transform frequency domain signals to time domain signals, the first CP inserting unit 480-1 and the second CP inserting unit 480-2 insert a cyclic prefix (CP) to outputs of the first and second IFTs 470-1 and 470-2, and the first IF/RF block 490-1 and the second IF/RF 490-2 amplify outputs of the first and second CP inserting units 480-1 and 480-2 and convert the amplified outputs to RF signals. In addition, the respective RF signals are transmitted through the first antenna 491-1 and the second antenna 491-2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A transmit diversity method of a mobile communication system for transmitting an input data symbol of length N using first and second transmission antennas, the method comprising:
   a) diversity encoding the input data symbol to generate first and second symbols for transmission from the first and second transmission antennas, respectively, and outputting the first symbol and the second symbols, wherein each of the first and second symbols have the same length N as the input data symbol;
   b) separating the first symbol into first and second groups of length N/2, and separating the second symbol into first and second groups of length N/2;
   c) generating an orthogonal code set of length N/2, and outputting first, second, third and fourth transmit symbols respectively generated by spreading each of the first and second groups of the first symbol and the first and second groups of the second symbol with the generated orthogonal code set; and
   d) mapping the first and the second transmit symbols to symbols in a frame of the frequency and time domains and transmitting the mapped first and second transmit symbols through the first transmission antenna, and mapping the third and the fourth transmit symbols to symbols in a frame of the frequency and time domains and transmitting the mapped third and fourth transmit symbols through the second transmission antenna.

2. The transmit diversity method of claim 1, wherein in b), the first and second groups of each of the first symbol and second symbols respectively include the odd numbered and even numbered samples of the symbols.

3. The transmit diversity method of claim 2, wherein the orthogonal code set includes N/2 orthogonal codes of length N/2.

4. The transmit diversity method of claim 1, wherein the second symbol is a conjugate of the first symbol.

5. The transmit diversity method of claim 4, wherein the first transmit symbol is derived from a first equation and the second transmit symbol is derived from a second equation, $$Ca_0 = \begin{bmatrix} c_0^{(0)} c_0^{(1)} \cdots c_0^{(\frac{N}{2}-1)} \\ c_1^{(0)} c_1^{(1)} \cdots c_1^{(\frac{N}{2}-1)} \\ \vdots \\ \vdots \\ c_{\frac{N}{2}-1}^{(0)} c_{\frac{N}{2}-1}^{(1)} \cdots c_{\frac{N}{2}-1}^{(\frac{N}{2}-1)} \end{bmatrix} \begin{bmatrix} a^{(0)} \\ a^{(2)} \\ \vdots \\ \vdots \\ a^{(N-2)} \end{bmatrix} \quad \text{<First Equation>}$$

$$= \begin{bmatrix} \sum_{i=0}^{\frac{N}{2}-1} c_0^{(i)} a^{(2i)} \\ \sum_{i=0}^{\frac{N}{2}-1} c_1^{(i)} a^{(2i)} \\ \vdots \\ \sum_{i=0}^{\frac{N}{2}-1} c_{\frac{N}{2}-1}^{(i)} a^{(2i)} \end{bmatrix}$$

$$Ca_1 = \begin{bmatrix} c_0^{(0)} c_0^{(1)} \cdots c_0^{(\frac{N}{2}-1)} \\ c_1^{(0)} c_1^{(1)} \cdots c_1^{(\frac{N}{2}-1)} \\ \vdots \\ \vdots \\ c_{\frac{N}{2}-1}^{(0)} c_{\frac{N}{2}-1}^{(1)} \cdots c_{\frac{N}{2}-1}^{(\frac{N}{2}-1)} \end{bmatrix} \begin{bmatrix} a^{(1)} \\ a^{(3)} \\ \vdots \\ \vdots \\ a^{(N-1)} \end{bmatrix} \quad \text{<Second Equation>}$$

$$= \begin{bmatrix} \sum_{i=0}^{\frac{N}{2}-1} c_0^{(i)} a^{(2i+1)} \\ \sum_{i=0}^{\frac{N}{2}-1} c_1^{(i)} a^{(2i+1)} \\ \vdots \\ \sum_{i=0}^{\frac{N}{2}-1} c_{\frac{N}{2}-1}^{(i)} a^{(2i+1)} \end{bmatrix}$$

$$(C: \frac{N}{2} \times \frac{N}{2})$$

orthogonal code matrix, $Ca_0$: first transmit symbol, $Ca_1$: second transmit symbol $a^{(i)}$: spreading target symbol, $c_u$: u-th orthogonal code sequences).

6. The transmit diversity method of claim 5, wherein the third transmit symbol is derived from a third equation and the fourth transmit symbol is derived from a fourth equation, $$C(-a_1)^* = \begin{bmatrix} c_0^{(0)} c_0^{(1)} \cdots c_0^{(\frac{N}{2}-1)} \\ c_1^{(0)} c_1^{(1)} \cdots c_1^{(\frac{N}{2}-1)} \\ \vdots \\ \vdots \\ c_{\frac{N}{2}-1}^{(0)} c_{\frac{N}{2}-1}^{(1)} \cdots c_{\frac{N}{2}-1}^{(\frac{N}{2}-1)} \end{bmatrix} \begin{bmatrix} -(a^{(1)})^* \\ -(a^{(3)})^* \\ \vdots \\ \vdots \\ -(a^{(N-1)})^* \end{bmatrix} \quad \text{<Third Equation>}$$

$$= \begin{bmatrix} \sum_{i=0}^{\frac{N}{2}-1} c_0^{(i)} (-a^{(2i+1)})^* \\ \sum_{i=0}^{\frac{N}{2}-1} c_1^{(i)} (-a^{(2i+1)})^* \\ \vdots \\ \sum_{i=0}^{\frac{N}{2}-1} c_{\frac{N}{2}-1}^{(i)} (-a^{(2i+1)})^* \end{bmatrix}$$

$$Ca_0^* = \begin{bmatrix} c_0^{(0)} c_0^{(1)} \cdots c_0^{(\frac{N}{2}-1)} \\ c_1^{(0)} c_1^{(1)} \cdots c_1^{(\frac{N}{2}-1)} \\ \vdots \\ \vdots \\ c_{\frac{N}{2}-1}^{(0)} c_{\frac{N}{2}-1}^{(1)} \cdots c_{\frac{N}{2}-1}^{(\frac{N}{2}-1)} \end{bmatrix} \begin{bmatrix} (a^{(0)})^* \\ (a^{(3)})^* \\ \vdots \\ \vdots \\ (a^{(N-1)})^* \end{bmatrix} \quad \text{<Fourth Equation>}$$

$$= \begin{bmatrix} \sum_{i=0}^{\frac{N}{2}-1} c_0^{(i)} (a^{(2i)})^* \\ \sum_{i=0}^{\frac{N}{2}-1} c_1^{(i)} (a^{(2i)})^* \\ \vdots \\ \sum_{i=0}^{\frac{N}{2}-1} c_{\frac{N}{2}-1}^{(i)} (a^{(2i)})^* \end{bmatrix}$$

$$(C: \frac{N}{2} \times \frac{N}{2})$$

orthogonal code matrix, $C(-a_1)^*$: third transmit symbol, $Ca_0^*$: fourth transmit symbol $-(a^{(i)})^*, (a^{(i)})^*$: spreading target symbol, $c_u$: u-th orthogonal code sequence).

7. The transmit diversity method of claim 1, wherein c) comprises mapping adjacent symbols in the time domain or in the frequency domain in the frame.

8. A base station transmitting apparatus of a mobile communication system for transmitting an input data symbol of length N using first and second transmission antennas, the base station transmitting apparatus comprising:

a diversity encoder for performing diversity encoding on the input data symbol to generate first and second symbols for transmission from the first and second transmission antennas respectively, wherein each of the first and second symbols have the same length N as the input data symbol;

a first divider for separating the first symbol, received from the diversity encoder, into first and second groups of length N/2;

a second divider for separating the second symbol, received from the diversity encoder, into third and fourth groups of length N/2;

an orthogonal code generator for generating an orthogonal code set of length N/2;

a spreader for generating first, second, third, and fourth transmit symbols by respectively spreading each of the first and second groups of the first symbol and the first and second groups of the second symbol with the generated orthogonal code set; and a symbol mapping block for mapping the first and second transmit symbols to symbols in frequency and time domains in a frame and transmitting the mapped first and second transmit symbols through the first transmission antenna, and mapping the third and fourth transmit symbols to symbols in frequency and time domains in a frame and transmitting the mapped third and fourth transmit symbols through the second transmission antenna.

9. The base station transmitting apparatus of claim 8, wherein the orthogonal code set generated by the orthogonal code generator includes N/2 orthogonal codes of length N/2.

10. The base station transmitting apparatus of claim 9, wherein the second symbol is a conjugate of the first symbol.

11. The base station transmitting apparatus of claim 10, wherein:

the first and second transmit symbols are respectively derived from the following First Equation and Second Equation, and the third and fourth transmit symbols are respectively derived from the following Third Equation and Fourth Equation:

$$Ca_0 = \begin{bmatrix} c_0^{(0)} c_0^{(1)} \cdots c_0^{(\frac{N}{2}-1)} \\ c_1^{(0)} c_1^{(1)} \cdots c_1^{(\frac{N}{2}-1)} \\ \vdots \\ \vdots \\ c_{\frac{N}{2}-1}^{(0)} c_{\frac{N}{2}-1}^{(1)} \cdots c_{\frac{N}{2}-1}^{(\frac{N}{2}-1)} \end{bmatrix} \begin{bmatrix} a^{(0)} \\ a^{(2)} \\ \vdots \\ \vdots \\ a^{(N-2)} \end{bmatrix} \quad \text{<First Equation>}$$

$$= \begin{bmatrix} \sum_{i=0}^{\frac{N}{2}-1} c_0^{(i)} a^{(2i)} \\ \sum_{i=0}^{\frac{N}{2}-1} c_1^{(i)} a^{(2i)} \\ \vdots \\ \sum_{i=0}^{\frac{N}{2}-1} c_{\frac{N}{2}-1}^{(i)} a^{(2i)} \end{bmatrix}$$

$$Ca_1 = \begin{bmatrix} c_0^{(0)} c_0^{(1)} \cdots c_0^{(\frac{N}{2}-1)} \\ c_1^{(0)} c_1^{(1)} \cdots c_1^{(\frac{N}{2}-1)} \\ \vdots \\ \vdots \\ c_{\frac{N}{2}-1}^{(0)} c_{\frac{N}{2}-1}^{(1)} \cdots c_{\frac{N}{2}-1}^{(\frac{N}{2}-1)} \end{bmatrix} \begin{bmatrix} a^{(0)} \\ a^{(3)} \\ \vdots \\ \vdots \\ a^{(N-1)} \end{bmatrix} \quad \text{<Second Equation>}$$

$$= \begin{bmatrix} \sum_{i=0}^{\frac{N}{2}-1} c_0^{(i)} a^{(2i+1)} \\ \sum_{i=0}^{\frac{N}{2}-1} c_1^{(i)} a^{(2i+1)} \\ \vdots \\ \vdots \\ \sum_{i=0}^{\frac{N}{2}-1} c_{\frac{N}{2}-1}^{(i)} a^{(2i+1)} \end{bmatrix}$$

$$(C: \frac{N}{2} \times \frac{N}{2})$$

orthogonal code matrix, $Ca_0$: first transmit symbol, $Ca_1$: second transmit symbol $a^{(i)}$: spreading target symbol, $c_u$: u-th orthogonal code sequence)

$$C(-a_1)^* = \begin{bmatrix} c_0^{(0)} c_0^{(1)} \cdots c_0^{(\frac{N}{2}-1)} \\ c_1^{(0)} c_1^{(1)} \cdots c_1^{(\frac{N}{2}-1)} \\ \vdots \\ \vdots \\ c_{\frac{N}{2}-1}^{(0)} c_{\frac{N}{2}-1}^{(1)} \cdots c_{\frac{N}{2}-1}^{(\frac{N}{2}-1)} \end{bmatrix} \begin{bmatrix} -(a^{(1)})^* \\ -(a^{(3)})^* \\ \vdots \\ \vdots \\ -(a^{(N-1)})^* \end{bmatrix} \quad \text{<Third Equation>}$$

$$= \begin{bmatrix} \sum_{i=0}^{\frac{N}{2}-1} c_0^{(i)} (-a^{(2i+1)})^* \\ \sum_{i=0}^{\frac{N}{2}-1} c_1^{(i)} (-a^{(2i+1)})^* \\ \vdots \\ \vdots \\ \sum_{i=0}^{\frac{N}{2}-1} c_{\frac{N}{2}-1}^{(i)} (-a^{(2i+1)})^* \end{bmatrix}$$

-continued $$Ca_0^* = \begin{bmatrix} c_0^{(0)} c_0^{(1)} \cdots c_0^{(\frac{N}{2}-1)} \\ c_1^{(0)} c_1^{(1)} \cdots c_1^{(\frac{N}{2}-1)} \\ \vdots \\ \vdots \\ c_{\frac{N}{2}-1}^{(0)} c_{\frac{N}{2}-1}^{(1)} \cdots c_{\frac{N}{2}-1}^{(\frac{N}{2}-1)} \end{bmatrix} \begin{bmatrix} (a^{(0)})^* \\ (a^{(3)})^* \\ \vdots \\ \vdots \\ (a^{(N-1)})^* \end{bmatrix}$$

$$= \begin{bmatrix} \sum_{i=0}^{\frac{N}{2}-1} c_0^{(i)} (a^{(2i)})^* \\ \sum_{i=0}^{\frac{N}{2}-1} c_1^{(i)} (a^{(2i)})^* \\ \vdots \\ \vdots \\ \sum_{i=0}^{\frac{N}{2}-1} c_{\frac{N}{2}-1}^{(i)} (a^{(2i)})^* \end{bmatrix}$$

< Fourth Equation >

$$(C: \frac{N}{2} \times \frac{N}{2}$$

orthogonal code matrix, $C(-a_1)^*$: third transmit symbol, $Ca_0^*$: fourth transmit symbol $-(a^{(i)})^*, (a^{(i)})^*$: spreading target symbol, $c_u$: u-th orthogonal code sequence)).

12. The base station transmitting apparatus of claim 8, wherein the symbol mapping block maps adjacent symbols to adjacent symbol periods in the time domain or frequency domain in the frame.

* * * * *